US010257707B2

(12) United States Patent
Spiegel et al.

(10) Patent No.: US 10,257,707 B2
(45) Date of Patent: Apr. 9, 2019

(54) METHOD FOR SAFE ACCESS TO A FIELD DEVICE

(71) Applicant: KROHNE Messtechnik GmbH, Duisburg (DE)

(72) Inventors: Christoph Spiegel, Oberhausen (DE); Markus Dabrowski, Duisburg (DE); Rene Keimling, Duisburg (DE); Christian Hansen, Hattingen (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 0 days.

(21) Appl. No.: 15/302,625

(22) PCT Filed: Mar. 20, 2015

(86) PCT No.: PCT/EP2015/055912
§ 371 (c)(1),
(2) Date: Oct. 7, 2016

(87) PCT Pub. No.: WO2015/154967
PCT Pub. Date: Oct. 15, 2015

(65) Prior Publication Data
US 2017/0041796 A1 Feb. 9, 2017

(30) Foreign Application Priority Data
Apr. 9, 2014 (DE) .......................... 10 2014 105 076

(51) Int. Cl.
*H04W 12/08* (2009.01)
*G05B 19/418* (2006.01)
(Continued)

(52) U.S. Cl.
CPC ............. *H04W 12/08* (2013.01); *G05B 11/01* (2013.01); *G05B 19/4185* (2013.01);
(Continued)

(58) Field of Classification Search
CPC .......... G05B 2219/31255; G05B 2219/31119; G05B 2219/31121; G05B 2219/14045;
(Continued)

(56) References Cited

U.S. PATENT DOCUMENTS 7,010,294 B1* 3/2006 Pyotsia ................ G05B 19/042
340/3.1
8,379,546 B2 2/2013 Schleiss et al.
(Continued)

FOREIGN PATENT DOCUMENTS

DE 10 2005 063 085 A1 7/2007
DE 10 2012 109 348 A1 4/2014
EP 2 579 116 A2 4/2013

OTHER PUBLICATIONS

Akerberg et al., Efficient integration of secure and safety critical industrial wireless sensor networks (Year: 2011).*
(Continued)

*Primary Examiner* — Hadi S Armouche
*Assistant Examiner* — Huan V Doan
(74) *Attorney, Agent, or Firm* — David S. Safran; Roberts Mlotkowski Safran Cole & Calderon, P.C.

(57) ABSTRACT

A method for providing safe access of a mobile control unit (1) to a field device (2), wherein, in particular, the field device is protected against unauthorized access via a mobile control unit is achieved in that a connection for transmitting data is established between the mobile control unit (1) and the field device (2), that access data for access is exchanged, that a comparison is made between the access data and stored comparison data and a comparison result is generated, and that access of the mobile control unit (1) to the field device (1) is permitted based on the comparison result.

7 Claims, 3 Drawing Sheets

(51) Int. Cl.
*G05B 11/01* (2006.01)
*H04L 29/06* (2006.01)
*H04W 12/06* (2009.01)
*H04L 29/08* (2006.01)

(52) U.S. Cl.
CPC ............. *G05B 2219/31255* (2013.01); *G05B 2219/36542* (2013.01); *H04L 63/083* (2013.01); *H04L 67/12* (2013.01); *H04W 12/06* (2013.01)

(58) Field of Classification Search
CPC ........... G05B 2219/25428; G05B 2219/31124; G05B 2219/31125; G05B 2219/36542; G05B 2219/31343; G05B 2219/31457; G05B 11/01; G05B 19/4185; H04W 12/08; H04W 12/06; H04L 67/12; H04L 63/083
See application file for complete search history.

(56) References Cited

U.S. PATENT DOCUMENTS

| | | | |
|---|---|---|---|
| 8,707,032 B2 | 4/2014 | Socky et al. | |
| 2006/0241913 A1* | 10/2006 | De Groot | G05B 19/0428 702/188 |
| 2007/0058654 A1* | 3/2007 | Arnold | H04L 63/0428 370/437 |
| 2008/0282332 A1* | 11/2008 | Jurisch | G05B 19/0428 726/6 |
| 2009/0048853 A1 | 2/2009 | Hall | |
| 2010/0153736 A1* | 6/2010 | Kilian | G05B 19/0428 713/185 |
| 2010/0315198 A1* | 12/2010 | Jurisch | G05B 19/042 340/5.2 |
| 2011/0004685 A1* | 1/2011 | De Groot | G05B 19/0425 709/225 |
| 2013/0086646 A1* | 4/2013 | Poschmann | H04W 12/08 726/4 |
| 2015/0287318 A1* | 10/2015 | Nair | G08C 17/02 340/5.52 |
| 2016/0132046 A1* | 5/2016 | Beoughter | G06F 17/30554 700/17 |

OTHER PUBLICATIONS

Muller et al., WirelessHART Fast Collect: a Decentralized Approach for Intermittent Field Devices, 6 pages (Year: 2013).*

* cited by examiner

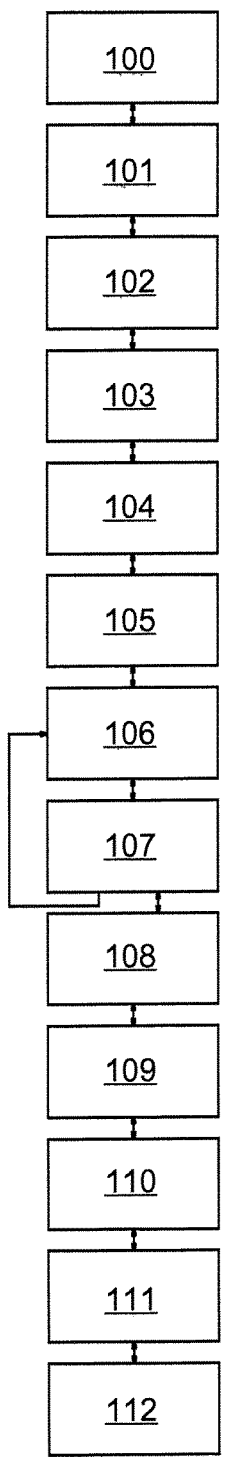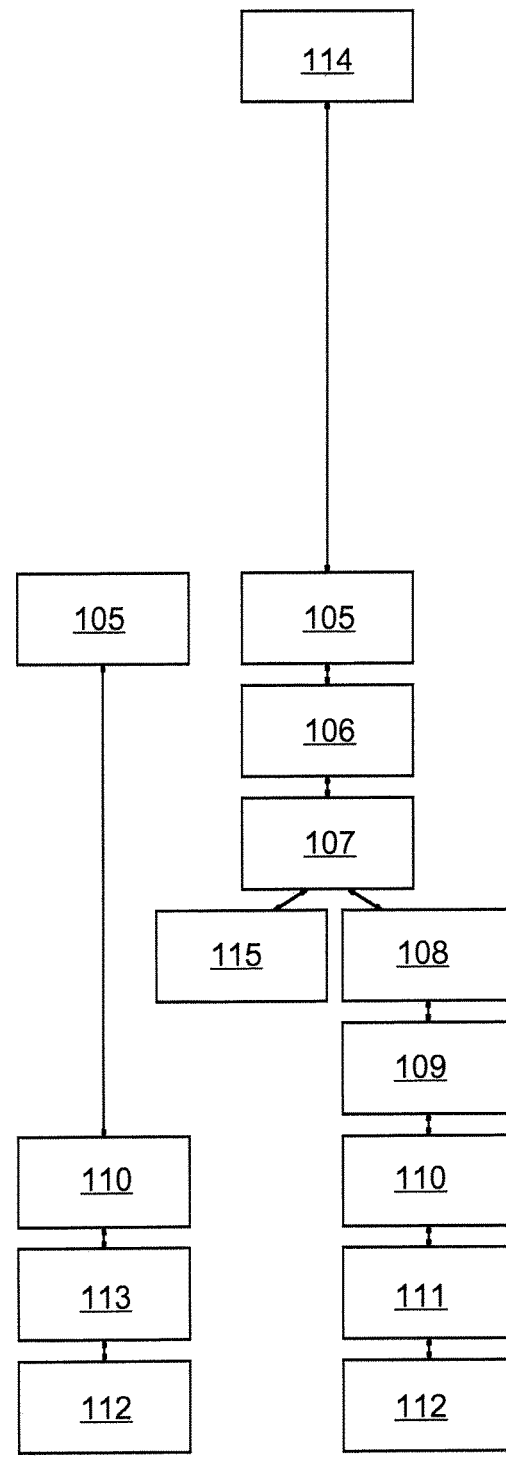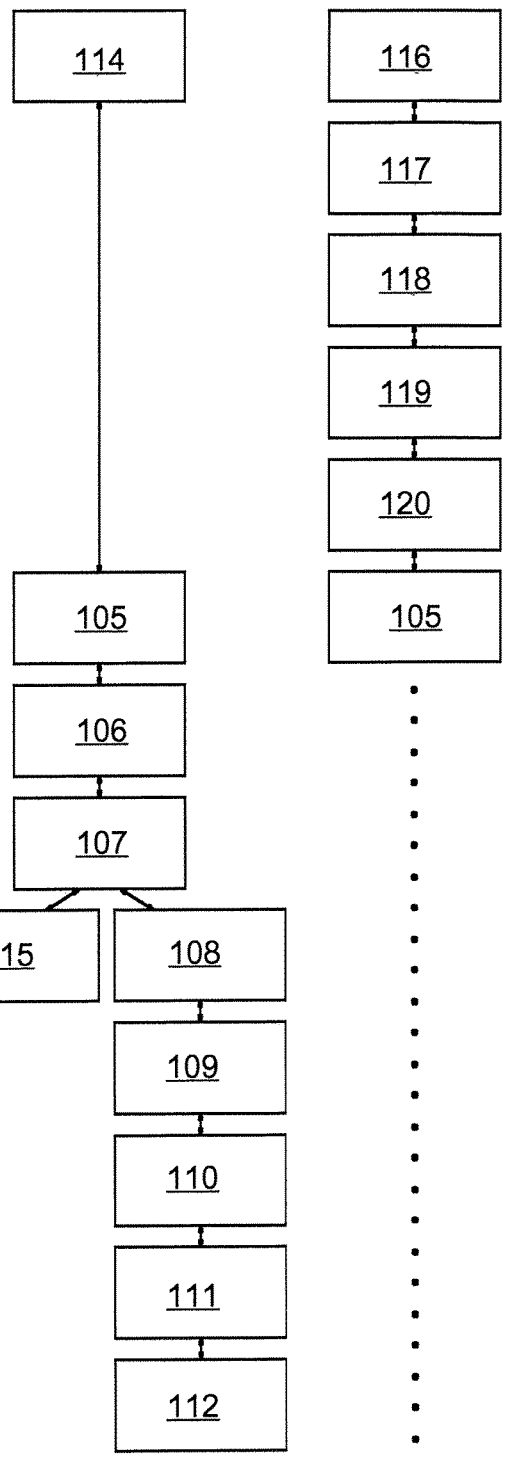
Fig. 2　　Fig. 3　　Fig. 4　　Fig. 5

METHOD FOR SAFE ACCESS TO A FIELD DEVICE

BACKGROUND OF THE INVENTION

Field of the Invention

The invention relates to a method for safe access of at least one mobile control unit to at least one field device.

Description of Related Art

It is common in modern process automation to monitor processes or media using measurements with measuring devices or to influence them using control elements. Such field devices—i.e., measuring devices or sensors and control elements or actuators—are usually connected to control rooms via so-called fieldbuses.

In order to directly contact the field devices on site, the field devices have, in some instances, so-called control and display units for representation of information as well as input or selection of data. Alternatively, there are particular interfaces, which allow direct connection of a, in particular mobile, control unit to the field device. These are called, for example, service interfaces. Some field devices also have wireless interfaces, which, in some instances, are a fixed component of the field device or are inserted in the field device via an adapter.

So-called handhelds are used for access to the field devices. These are generally specially developed to be able to be used in industrial applications and, in particular, for process automation.

These mobile—i.e., for the most part, portable—handhelds allow, in some instances, a direct connection to a field device or they can be connected to the respective fieldbus for influencing the field device or, for example, for reading data.

A mobile operating unit in the following is any type of portable or transportable unit that allows an input of data or information, a selection between alternatives, a display of data or processes, or another type of implementation of human-machine interaction—here, in particular with a field device.

Insofar as it is possible to directly access a field device, it is necessary to prevent non-authorized access from taking place.

Since processes are controlled and monitored using field devices, this function, on the one hand, needs to be ensured and, on the other hand, valuable information can be obtained from the processes. Thus, on the one hand, it is necessary to prevent interference of control of the processes or, respectively, their measurements, e.g., by setting of incorrect parameters or changing of software. On the other hand, data that may, for example, provide information about formulas etc. should not reach unauthorized persons.

SUMMARY OF THE INVENTION

The object of the invention is thus to provide a method for safe access of a mobile control unit to a field device, wherein, in particular, the field device is protected against unauthorized access via a mobile control unit.

The method according to the invention, in which the above derived and described object is achieved, is initially and essentially characterized in that a connection for transmitting data is established at least between the mobile control unit and the field device. Originating from the connection or via the connection, access data for access of the mobile control unit is transmitted to the field device. In this manner, for example, the field device receives access data for the mobile control unit that is associated with a pursued access from the mobile control unit. Then, a comparison is made between the access data and stored comparison data and a respective comparison result is generated. The comparison result is, for example, a match between the transmitted data and the stored data. The comparison result, however, can also indicate a discrepancy. Accordingly, access of the mobile control unit to the field device is permitted or denied based on the comparison result.

The method according to the invention thus allows for safe access, which is granted to a mobile control unit by a field device, so that the mobile control unit has access to the field device. The method can, thus, also be understood as a method for safe initiation or commencement of data traffic between a mobile control unit and a field device.

In one implementation, access data is, thereby, transmitted to the field device and the comparison between the transmitted access data and the stored comparison data takes place in the field device.

The type of access data or respective stored data is described in more detail in the following implementations.

In one implementation, at least one access code is assigned to the field device for access to the field device and the access code is stored as at least a part of the comparison data. In this implementation, a code is assigned to the field device and stored there—preferably in the form of an alphanumeric character string. Storage, in one implementation, thereby preferably takes place in the field device itself.

Thus, if, in the initiation of access to the field device, the correct character sequence as access data or possibly, more exactly, as one piece of access data is transmitted from the mobile control unit, then the field device acknowledges that access is being attempted by an authorized person and, thus, is preferably allowable.

Additionally or alternatively, one implementation provides that an identification code is assigned to the mobile control unit and is stored as at least a part of the comparison data. This identification code is transmitted—for example, to the field device—as at least a part of the access data. Additionally, the comparison at least between the identification code and stored comparison data is carried out and a comparison result is generated.

In this implementation, the mobile control unit is characterized by the identification code and can quasi identify itself in this way. For access, either only the identification code or the identification code in conjunction with the access code is used to generate the comparison result.

This implementation has the advantage that such an access-authorized mobile control unit can be identified as such. Thus, it is sufficient to use an access-authorized mobile control unit without transmitting the access code of the field device. In one implementation, this also allows access to field devices, for which the respective access code is not known, in that such a mobile control unit is used, whose identification code is stored accordingly.

In an alternative implementation, having only the access code of the field device is not sufficient, but rather access can only occur via a correspondingly known mobile control unit.

Storing the identification code at least as a part of the comparison data and, thus, quasi entering the mobile control unit to a list of trustworthy control units takes place, in one implementation, in the case that a comparison result generated for the comparison between access data transmitted from the control unit and the stored access code is positive.

The first contact between the mobile control unit and the field device, thus, takes place using the access code, and the identification code of the mobile control unit—in comparing the agreement—is stored in the comparison data.

The specification of the access code to the field device, in one implementation, takes place at the factory during manufacture of the field device.

In an alternative implementation, the access code is entered—in particular during the first start-up after installation of the field device—into the field device itself, e.g., via a corresponding input device.

In a further implementation, the assignment of the access code is carried out using input at the mobile control unit, i.e., the corresponding character chain is input via the mobile control unit and then stored accordingly. In this implementation, the field device does not need its own human-machine interface.

Normally, one process system has a plurality of field devices.

Thus, one implementation provides that access codes from at least two field devices are stored in the mobile control unit. The mobile control unit, thus, has the possibility of accessing at least two field devices using the respective access code.

An associated implementation involves the mobile control unit sharing the access code stored in it with another mobile control unit.

In this implementation, a first control unit, thus, allows a second mobile control access to its access codes, so that the second control unit can also access the at least two field devices. This sharing or the sharing process is, in one implementation, implemented directly between the two mobile control units and, in a further implementation, is carried out via an administrator device, e.g., in the form of a server.

In this exchange of access codes, it is additionally provided that, in one implementation, the identification codes of the control units are also used for the authorized access to the field devices and are accordingly retrieved.

In one implementation, identification codes from at least two mobile control units are stored in one field device, so that preferably also the at least two mobile control units can access the field device.

In an associated implementation, it is provided that the field device shares the identification codes stored in it with another field device.

In a further implementation, identification codes of mobile control devices that are not allowed access are also stored. In this implementation, the stored data, thus, consists of exclusion lists.

For the handling of the access code and the specific processing of the access of the mobile control unit to the field device, it is provided, in one implementation, that the access data to be transmitted for access to the field device is input in the mobile control unit.

In this implementation, for example, the character chain is directly input into the mobile control unit by the operator—e.g., using a real or virtual keyboard—and is then transmitted to the field device as access data. The person, thus, enters, for example, the access code of the field device and this input is transmitted to the field device together with the identification code as access data.

In an alternative implementation, the access data to be transmitted—in particular by the mobile control unit—is taken from a pool of stored access data—in particular in the mobile control unit.

In one implementation, the mobile control unit, thus, has a collection of access data that allows access to the different field devices. For specific access, data is either chosen from a list by the operator or the mobile control unit automatically and autonomously uses a corresponding set of access data.

In one implementation, the mobile control unit determines which field devices or other mobile control units are using the same communication network. In particular for the field devices, to which access from the mobile control unit is fundamentally allowed, the mobile control unit—preferably, when it does not have all necessary access data—retrieves the necessary access codes of the determined field devices from another control unit and/or from an administrator device.

Thereby, in one implementation, an administrator device—e.g., a server having at least one respective communication interface—is generally provided, via which storing and/or sharing of access data such as access and/or identification codes can be carried out. Additionally or alternatively, the administrator device is used at least in part or completely for comparing access data to stored comparison data.

Finally, the implementation provides that data is exchanged at least partially encrypted at least between the mobile control unit and the field device.

In detail, there is a plurality of possibilities for designing and further developing the method according to the invention as will be apparent from the following description of embodiments in conjunction with the accompanying drawings.

BRIEF DESCRIPTION OF THE DRAWINGS

FIG. 2 is a flow chart for a first embodiment of safe access of a mobile control unit to a field device, FIG. 3 is a flow chart for a second embodiment of safe access of a mobile control unit to a field device, FIG. 4 is a flow chart for a third embodiment of safe access of a mobile control unit to a field device, FIG. 5 is a flow chart for a fourth variation of safe access of a mobile control unit to a field device.

DETAILED DESCRIPTION OF THE INVENTION

Figure 1:
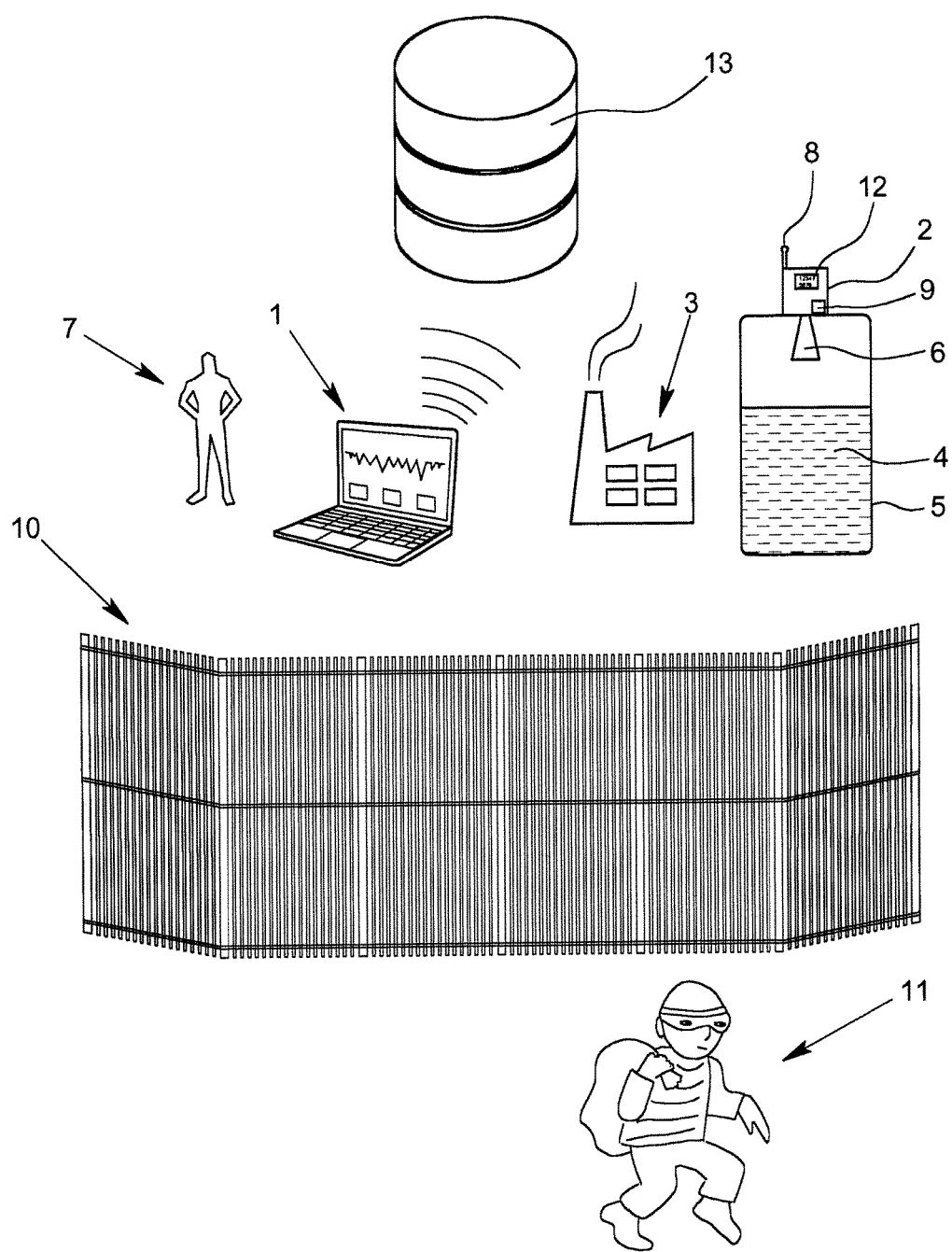
FIG. 1 is a schematic representation of access of a mobile control unit to a field device.

An example for safe access of a mobile control unit 1 to a field device 2 is represented in FIG. 1. The access, which can also be called authentication of the mobile control unit 1 for the field device 2, thereby takes place within a process system 3.

Here, the field device 2 is a measuring device for determining the fill level of a medium 4 in a container 5.

In the illustrated embodiment, measurement is carried out using the radar principle, wherein an antenna 6 is provided for sending and receiving electromagnetic radiation.

The mounting position of the field device 2 on the container 5 makes direct operation by the operator 7 difficult, e.g., installing software or setting parameters or reading measurement or history data.

Thus, here, the mobile control unit 1 is used in the form of a laptop, which communicates, i.e., in particular exchanges data, wirelessly with the field device 2 or, more specifically, via its wireless interface—indicated here by an accessory antenna 8.

For data communication, the operator 7 brings his mobile control unit 1 in relative proximity to the field device 2 and starts an application program (e.g., in the form of a so-called app) on the mobile control unit 1, which then wirelessly connects to the field device 2.

Thereby, the mobile control unit 1 transmits access data to the field device 2. The access data, in particular, is the presettable access code of the field device 2 and/or the specific identification code of the mobile control unit 1 itself.

The access code of the field device 2, for example, is thereby preset during manufacture of the field device 2 or at the initial start-up of the field device 2 in the process and, in particular, is also securely stored in the field device 2.

The received access data are, in turn, compared to data stored in a data storage 9 by the field device 2.

Based on the comparison or the comparison result associated with it, the mobile control unit 1 is granted or denied access to the field device 2.

The input or transmission of access data and their comparison to stored data—regardless of whether it is the special access code of the field device 2 or the identification code (quasi the ID) of the mobile control unit 1—controls the access to the field device 2 and thereby represents an internal extension of a fence 10, as it symbolically encloses the area around the process system and as it physically prevents unauthorized intrusion.

In order to simplify access of the trustworthy mobile control unit 1 to the field device 2, the identification code of the respective mobile control unit 1 is stored in the field device, in particular after successful access. That means that, when attempting to make contact again, the mobile control unit 1 only has to transmit its identification code to the field device and is immediately identified as trustworthy by the field device based on the stored data, and access is allowed.

If a potential data thief 11 should attempt to access the field device 2, the thief will not succeed, because, on the one hand, the thief does not have the specific access code of the field device 2 or, respectively, he is not using a mobile control unit 1 that has previously carried out authorized data exchange with the field device 2.

The field device 2 has an input device 12, for example, in the form of a keyboard, and preferably also a display device for the user 7 to assign the access code to the field device 2. The input device 12 is called human-machine interface (HMI) in the prior art.

The specific access code is entered via the input device 12 at initial installation and then securely stored in the data storage 9.

The input device 12 can be directly used at initial installation despite the awkward mounting position, since the operator 7 is usually in immediate proximity to the field device 2 during installation.

Preferably, data communication is blocked via the interface with the accessory antenna 8 until the access code is securely stored in the field device 2 and, thereby, safe data transfer can be ensured.

Furthermore, an administrator device 13 is also provided, e.g., in the form of a server.

The field device 2 transmits the identification code of the respective mobile control unit 1 to the administrator device 13 after a successful access attempt. Thus, a database of trustworthy mobile control devices 1 is formed using the effective identification.

In the following diagrams illustrating different procedures of safe access to a field device, essentially identical steps are marked with the same reference numbers.

Transmission of data between the mobile control unit 1 and the field device 2 takes place with encryption. The communication can thereby be carried out over further intermediary devices or intermediary stations.

The steps of an access procedure of a mobile control device to a field device are shown in FIG. 2.

In step 100, an access code is preset in the field device via an input device and is securely stored in the field device. Thereby, for example, it is ensured that this code cannot be subsequently changed.

In step 101, the interface is unlocked, via which data communication between the field device and a mobile control unit can be implemented. The unlocking is possible, since it can be ensured with the retrieval of access data, that access to the field device is only possible for a chosen circle of people or only using trustworthy mobile control units.

In step 102, an application program—app—is activated on the mobile control unit.

The application program, thereby, is an implementation of a stand-alone program, i.e., a so-called stand-alone app. In another implementation, the application program is a component of another program. Overall, the application program is used for authorized access of the mobile control unit to the field device.

The preset access code of the field device provided in step 100 is input in the mobile control unit in step 103 via the application program activated in step 102 and is stored in the mobile control unit in step 104. Thus, the mobile control unit can autonomously access the respective field device in one variation.

Alternatively, step 104 is omitted and the access code of the field device has to be input directly in the mobile control unit each time for access to the field device.

In step 105, the mobile control unit is brought in proximity to the field device so that data transfer between the two is possible.

Communication is thereby carried out, for example, using WLAN or a Wi-Fi or BLUETOOTH® connection, wherein, possibly, also parts of the transmission paths are crossed with industrial application protocols and, specifically, process automation protocols.

In step 106, connection establishment takes place between the mobile control unit and the field device. In the case of a Bluetooth connection, this is called pairing. Direct access of the mobile control unit to the field device is not yet granted, thereby.

Additionally, the mobile control unit transmits access data to the field device. This access data thereby is composed of at least the access code assigned to the field device, which was stored in the mobile control unit in step 104.

In step 107, the field device compares the received access data to the access code assigned to the field device.

If there is a deviation, the procedure returns to step 106, so that the operator or the mobile control unit has a further chance to input the correct access data.

If there is agreement, i.e., in the case that the transmitted access data contains at least the access code, access of the mobile control unit to the field device is allowed in step 108.

Then, in step 109, the mobile control unit and the field device exchange further communication data with one another.

As part of the pairing, or here, as special step 110, the mobile control unit transmits its identification code, e.g., in the form of an ID clearly assigned to the mobile control unit, to the field device.

The identification code is stored in the field device in step 111 for future access of the mobile control unit to the field device.

In step 112, the actual communication between the mobile control unit and the field device takes place. This, for example, is the input of parameters or the installation of software in the field device or the reading of measurement or history data from the field device.

For another mobile control unit, the procedure would begin at step 105 in the following, since the input of the access code for the field device is accordingly no longer required or, preferably, is no longer possible.

Further contact establishment between the field device and the mobile control unit following the first part of the procedure in FIG. 2, which, in particular, was used for the procedure of FIG. 2, is shown in FIG. 3.

In step 105, the required proximity between the mobile control unit and the field device is created, whereupon the mobile control unit transmits its identification code as access data to the field device.

That data or the code—regardless of whether access or identification code—can thereby consist in general of a plurality of preferably alphanumeric characters. However, in one variation, it is possible to use just one character, and, thus, just one piece of data.

In step 113, the field device compares the received identification code to the data, which was stored during the previous contact establishment between the field device and the mobile control unit or, respectively, during the very first access—see FIG. 2—, and generates a comparison result based on this comparison.

Based on the comparison result, the field device allows access in the case of a positive comparison, and thus, preferably, also data transfer between the mobile control unit and the field device in step 112.

The advantage of this variation is that the mobile control unit identifies itself as such and that, for that reason, based on previous data communication, it can already be verified whether access to the field device is allowable.

FIG. 4 shows an alternative variation to FIG. 3 of the procedure of starting secure communication between a field device and a mobile control unit.

In step 114, a mobile control unit receives the access code from an administrator device, which is, for example, a server.

Subsequently, the operator approaches the field device with his mobile control unit in step 105 so that data communication is possible based on the technical conditions. This is dependent on whether only direct connection is to take place between the field device and the mobile control unit or whether other devices are interposed for data transmission.

In step 106, the transmission of access data from the mobile control unit to the field device follows. This access data is, thereby, preferably that data, which was provided in step 114 from the administrator device to the mobile control unit.

In step 107, the comparison of received access data to the data stored in the field device is carried out again, wherein, here, in the case of a negative comparison result, an alarm is triggered in step 115.

In the case of a positive result, i.e., the agreement between the data transmitted from the mobile control unit and the data stored in the field device, the mobile control unit allows access to the field device in step 108 and the procedure follows as in FIG. 2.

A variation of the embodiment according to FIG. 2 in respect to input of the access code of the field device is shown in FIG. 5. The field device can, thereby, in particular, also be designed without its own input device.

In this variation of FIG. 5, the field device has not yet been assigned an access code.

For this reason, the interface for data communication—here a wireless interface for wireless communication with a mobile control unit—is configured so that although data exchange, e.g., in the form of pairing, i.e., the exchange of parameters, etc. required for data communication is possible, further access to the actual data of the field device, such as measurement data, history data, measurement or control parameters, or parts of software or firmware is not possible.

In the first step 116, the mobile control unit is brought in proximity to the field device.

When thereby entering the access code, it can also be provided that a direct connection, e.g., via a service interface, is created in the field device or that e.g., a seal or a sticker acting as seal is destroyed on the field device.

If data communication is physically possible, then an application program is started on the mobile control unit in step 117, which specifically allows the input of access codes.

The input of the—thereby henceforth valid—access code of the field device takes place in the mobile control unit.

Thus, the operator enters, for example, the sequence of numbers and letters using a real or virtual keyboard of the mobile control unit.

In step 119, this access code is transmitted from the mobile control unit to the field device and stored there in step 120.

Since an access code ensuring the authorized access is now provided and, therefore, access to the field device is ensured, the mentioned interface of the field device is also principally unlocked for further access to the field device in this step 120.

In the following, the procedure shown in FIG. 2 takes place again starting at step 105 (for clear arrangement, only dots are used).

Figure 6:
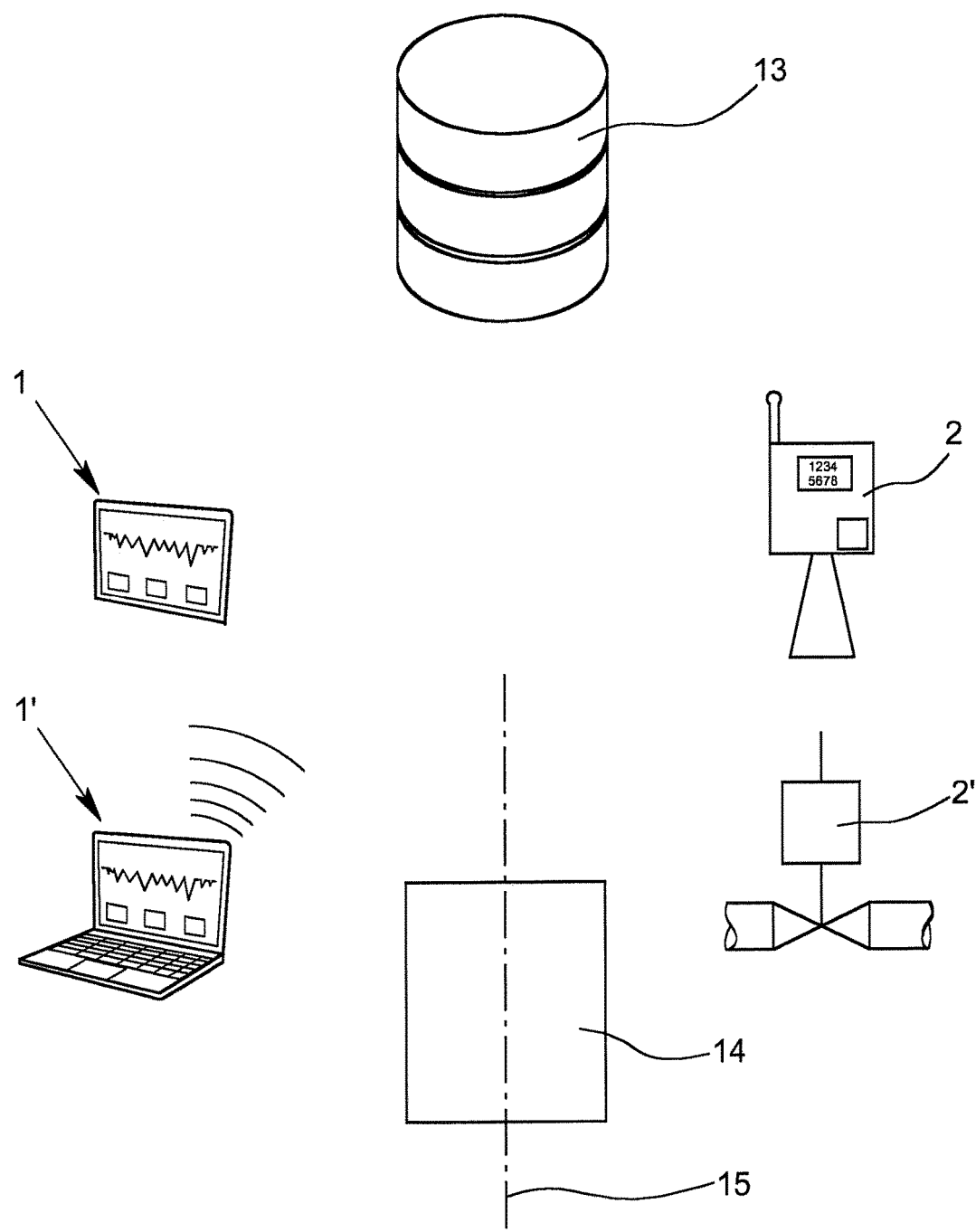
FIG. 6 is a configuration for safe access with two control units and two field devices.

Two field devices 2, 2' are provided in FIG. 6 (one is a measuring device—i.e., a sensor—and the other is a control element—i.e., an actuator) and two mobile control units 1, 1' (one is in the form of a tablet and another in the form of a laptop).

Additionally, a transmitter device 14 is also shown, which implements data communication between or, respectively, safe separation of the two application areas consumer electronics (left side, here) and industry electronics or, respectively, process automation electronics (right side, here).

In a further—not shown here—implementation, the transmitter device 14 is connected to the field device 2' via a cable.

In another—also not shown—implementation, the transmitter device 14 is directly connected to the field device 2' and is located, for example, in a common housing.

In order to indicate that the devices used, common protocols and safety mechanisms definitely differ from one another, a border 15 is provided.

Conversely, this means that mobile control units from the consumer sector can also be used for application in the field of process automation with the field devices.

The mobile control units 1, 1' are thereby designed so that they exchange access codes for different field devices with one another via the administrator device 13 or directly with one another.

Additionally or alternatively, the field devices 2, 2' also receive—for example, here, via the administrator device 13—the identification code of the mobile control units 1 that may be granted access.

Procedures, methods and programs from the application field of information technology for consumers is used in the mobile control units 1, 1' and also in the administrator device 13.

In one variation, the mobile control units 1, 1' scan the network, which results, in particular, from the devices in the wireless range of the mobile control units, for field devices 2, 2' or other mobile control units 1, 1', with which connection is possible and for which possibly the necessary access data is present or has to be installed.

The invention claimed is:

1. Method for safe accessing of at least one field device by at least one mobile control unit, comprising:
    establishing a connection for transmitting data at least between the mobile control unit and the field device,
    transmitting access data for accessing of the mobile control unit to the field device, comparing the access data with stored comparison data and generating a comparison result,
    permitting access of the mobile control unit to the field device based on the comparison result indicating that access is permissible,
    wherein at least one access code is assigned to the field device for access to the field device and wherein the access code is stored as at least a part of the comparison data,
    wherein an identification code is assigned to the mobile control unit and is transmitted to the field device as at least a part of the access data, and
    wherein the identification code is stored in the field device as at least a part of the comparison data in the case that the comparison result generated for the comparison of the access data transmitted by the mobile control unit and the stored access code is positive and that in case of a further access of the field device by the mobile control unit only the identification code is transmitted from the mobile control unit to the field device.

2. Method according to claim 1, wherein access codes from at least two field devices are stored in the mobile control unit and wherein the access codes stored in the mobile control unit are shared by the mobile control unit with another mobile control unit.

3. Method according to claim 1, wherein at least the field devices that are accessable are identified by the mobile control unit, and wherein necessary access codes of the identified field devices are retrieved by at least one of another mobile control unit and an administrator device.

4. Method according to claim 1, wherein an adminstrator device is provided via which at least one of storing and sharing of at least one of access codes and identification codes is able to be carried out.

5. Method according to claim 4, wherein the comparison of access data with stored comparison data is performed at least partially by an administrator device.

6. Method according to claim 1, wherein the comparison of access data with stored comparison data is performed at least partially by an administrator device.

7. Method claim 1, wherein data is exchanged in at least partially encrypted form at least between the mobile control unit and the field device.

* * * * *